(12) United States Patent
Ito et al.

(10) Patent No.: US 12,442,970 B2
(45) Date of Patent: Oct. 14, 2025

(54) LIGHTING COVER AND DISPLAY DEVICE

(71) Applicant: NISSHA CO., LTD., Kyoto (JP)

(72) Inventors: Tatsuo Ito, Kyoto (JP); Daichi Hama, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 495 days.

(21) Appl. No.: 17/785,757

(22) PCT Filed: Oct. 28, 2020

(86) PCT No.: PCT/JP2020/040437
§ 371 (c)(1),
(2) Date: Jun. 15, 2022

(87) PCT Pub. No.: WO2021/124692
PCT Pub. Date: Jun. 24, 2021

(65) Prior Publication Data
US 2023/0071280 A1    Mar. 9, 2023

(30) Foreign Application Priority Data

Dec. 16, 2019  (JP) ................................ 2019-226204

(51) Int. Cl.
*F21V 8/00*    (2006.01)
*G06F 3/044*    (2006.01)

(52) U.S. Cl.
CPC ........... *G02B 6/005* (2013.01); *G02B 6/0068* (2013.01); *G02B 6/0073* (2013.01); *G06F 3/044* (2013.01)

(58) Field of Classification Search
CPC .... G02B 6/005; G02B 6/0068; G02B 6/0073; G06F 3/044
See application file for complete search history.

(56) References Cited

U.S. PATENT DOCUMENTS

| | | | |
|---|---|---|---|
| 6,991,357 B2 * | 1/2006 | Wimbert ............... | F21S 43/241 362/323 |
| 8,540,921 B2 * | 9/2013 | Senibi .................... | B32B 9/007 264/316 |
| 2007/0285917 A1 * | 12/2007 | Wadia .................... | G09F 9/302 362/257 |
| 2009/0290354 A1 * | 11/2009 | Moriyama .............. | F21V 29/75 362/296.01 |
| 2011/0267811 A1 | 11/2011 | De Ryckel et al. | |

(Continued)

FOREIGN PATENT DOCUMENTS

| | | |
|---|---|---|
| JP | H11167357 A | 6/1999 |
| JP | 2006286533 A | 10/2006 |

(Continued)

*Primary Examiner* — Abdulmajeed Aziz
*Assistant Examiner* — Jessica M Apenteng
(74) *Attorney, Agent, or Firm* — Alleman Hall & Tuttle LLP

(57) ABSTRACT

To enable a lighting cover disposed over a plurality of light-emitting portions to have a soft tactile sensation, the lighting cover includes a light guide member and a soft light-transmissive member. The light guide member has a plurality of isolation spaces arranged to correspond to the plurality of light-emitting portions, and guides light from the plurality of light-emitting portions. The soft light-transmissive member has a soft tactile sensation, and transmits light generated from the plurality of light-emitting portions by being disposed on an outer side of the light guide member.

20 Claims, 7 Drawing Sheets

(56) References Cited

U.S. PATENT DOCUMENTS

| | | | | |
|---|---|---|---|---|
| 2016/0018690 A1* | 1/2016 | Chen | ................. | G02F 1/133308 |
| | | | | 312/7.2 |
| 2019/0275934 A1* | 9/2019 | Cho | ....................... | B60Q 3/217 |
| 2020/0284489 A1* | 9/2020 | Finell | ...................... | F25C 1/243 |

FOREIGN PATENT DOCUMENTS

| JP | 2007324047 A | 12/2007 |
|---|---|---|
| JP | 2008059863 A | 3/2008 |
| JP | 2019179711 A | 10/2019 |
| JP | 2019194985 A | 11/2019 |

\* cited by examiner

LIGHTING COVER AND DISPLAY DEVICE

TECHNICAL FIELD

The present invention relates to a lighting cover disposed over a plurality of light-emitting portions.

BACKGROUND ART

In the related art, in a display device having a plurality of light-emitting portions (for example, light-emitting diodes (LEDs)) arranged on a flat surface, it is known to provide a light-shielding portion that shields light generated from a light-emitting portion so as not to reach the other light-emitting portions (for example, see PTL 1).

Providing such a light-shielding portion enables clear display of characters, figures, and the like displayed using the light-emitting portions.

CITATION LIST

Patent Literature

PTL 1: JP 11-167357 A

SUMMARY OF INVENTION

Technical Problem

In recent years, it is conceivable to apply a display device which can display characters, figures, and the like using a plurality of light-emitting portions, for example, to an interior such as an interior of a passenger car. In such a case, in order to maintain a sense of luxury in the interior incorporating the display device, it is desirable to bring the tactile sensation of the display device closer to the tactile sensation of the interior. For example, when a display device is incorporated into an interior having a soft tactile sensation, it is desirable that the display device also has a soft tactile sensation.

An object of the present invention is to enable a lighting cover disposed over a plurality of light-emitting portions to have a soft tactile sensation.

Solution to Problem

Some aspects will be described below as means to solve the problems. These aspects can be combined arbitrarily as necessary.

The lighting cover according to an aspect of the present invention is disposed over a plurality of light-emitting portions. The lighting cover includes a light guide member and a soft light-transmissive member.

The light guide member has a plurality of isolation spaces corresponding to the plurality of light-emitting portions, and guides light from the plurality of light-emitting portions.

The soft light-transmissive member has a soft tactile sensation, and transmits light generated from the plurality of light-emitting portions by being disposed on an outer side of the light guide member.

In the lighting cover for the plurality of light-emitting portions described above, on the outer side of the light guide member that guides light from the plurality of light-emitting portions, the soft light-transmissive member that has a soft tactile sensation and transmits the light is disposed.

With the above configuration, the lighting cover can have a soft tactile sensation while outputting light from the plurality of light-emitting portions in a clear state.

The light guide member may have light shielding walls and a surface wall.

The light shielding walls form a plurality of isolation spaces.

The surface wall is formed on an opposite side of the plurality of light-emitting portions of the light shielding walls and supports the soft light-transmissive member.

With the above configuration, the soft light-transmissive member can be reliably supported on the light guide member while reliably shielding light from a light-emitting portion with respect to each of the light-emitting portions.

The light shielding walls may have a rigidity lower than that of the surface wall.

With the above configuration, a soft tactile sensation can be generated not only in the soft light-transmissive member but also in the light guide member. As a consequence, a lighting cover that seems luxurious can be realized.

The light shielding walls may be thinner than the surface wall.

With the above configuration, the light guide member can be made soft by a simpler structure.

The light shielding walls may have a zigzag shape.

The light guide member may further include a base portion formed on the same side as the plurality of light-emitting portions of the light shielding walls. The widths of the surface wall and the base portion are the same as those of the light shielding walls.

The display device according to another aspect of the present invention includes the lighting cover and the plurality of light-emitting portions described above.

Advantageous Effects of Invention

The lighting cover and the display device according to the present invention can seem luxurious with soft tactile sensation.

DESCRIPTION OF EMBODIMENTS

1. First Embodiment (1) Configuration of Display Device

Figure 1:
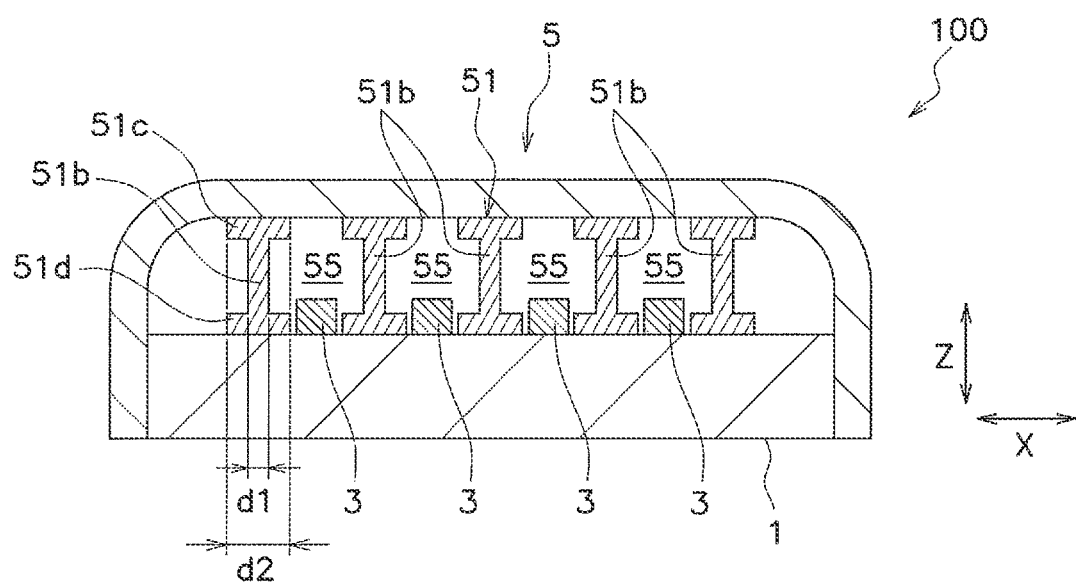
FIG. 1 is a cross-sectional view of a display device according to a first embodiment.
Figure 2:
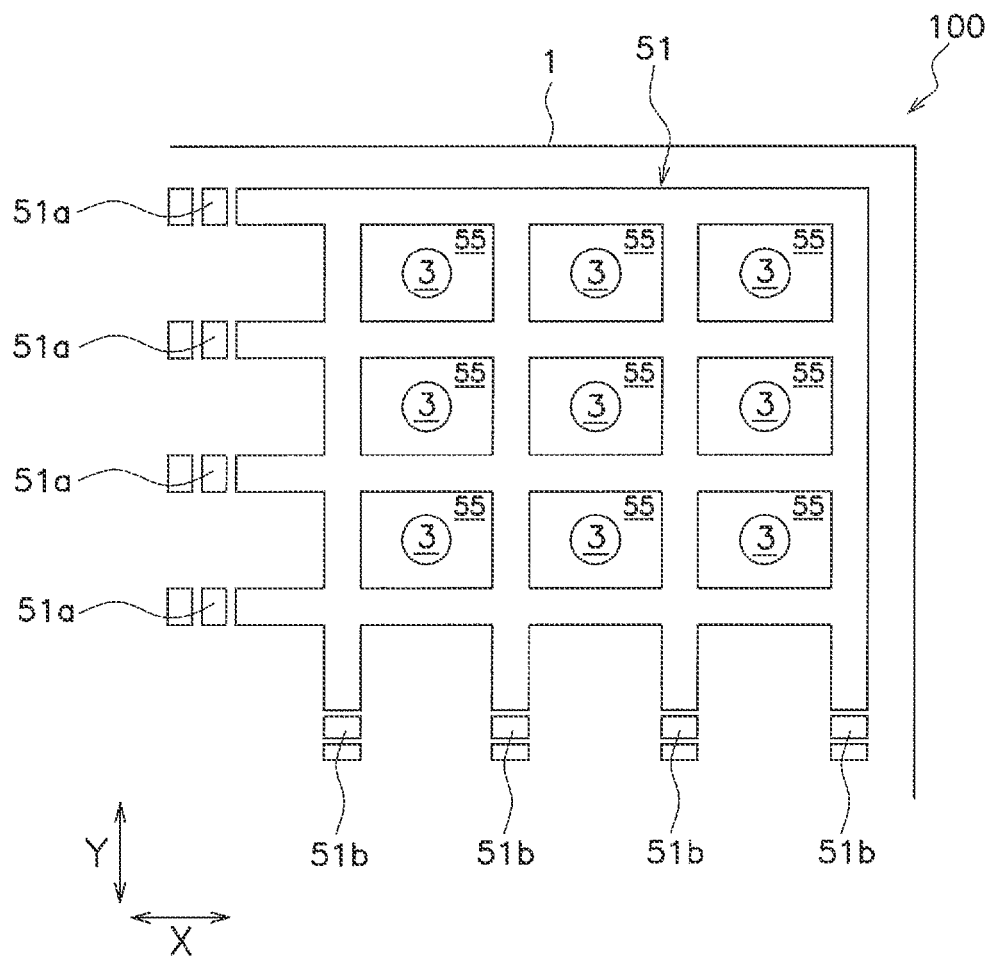
FIG. 2 is a top view of the display device.

A display device 100 according to a first embodiment will be described with reference to FIG. 1 and FIG. 2. FIG. 1 is a cross-sectional view of the display device according to the first embodiment. FIG. 2 is a top view of the display device. In FIG. 1 and FIG. 2, a lateral direction of a substrate 1 is defined as an X direction, and a longitudinal direction thereof is defined as a Y direction. Furthermore, a thickness direction of the substrate 1 is defined as a Z direction.

First, the display device 100 will be schematically described.

The display device 100 is a device that includes a plurality of light-emitting portions 3 and displays any shape such as characters and figures by generating light from a predetermined light-emitting portion 3 among the plurality of light-emitting portions 3 (dot matrix display device). The display device 100 is used for displaying characters, figures, and the like in, for example, a soft portion such as an armrest and a handle in a vehicle. In addition, the display device 100 can also be used in furniture, home appliances, and the like.

As will be described below, when a user touches the display device 100, the display device 100 can give the user a tactile sensation at a location where the display device 100 is provided. That is, the display device 100 has flexibility of giving a tactile sensation similar to that of the installation location thereof. This makes it possible to increase a sense of luxury in a location where the display device 100 is provided.

Next, a specific configuration of the display device 100 will be described. The display device 100 includes a substrate 1, the plurality of light-emitting portions 3, and a lighting cover 5.

The substrate 1 fixes the plurality of light-emitting portions 3, and is provided with an electric circuit (not illustrated) or the like that controls the light emission thereof. The substrate 1 may have a planar shape or a three-dimensional shape depending on the usage thereof.

The plurality of light-emitting portions 3 are, for example, light-emitting elements such as light-emitting diodes (LEDs). As illustrated in FIG. 2, the plurality of light-emitting portions 3 are arranged side by side in the X direction and the Y direction of the substrate 1 to form a matrix. When any of the plurality of light-emitting portions 3 is selected and light is emitted, characters, figures, and the like corresponding to the position of the selected light-emitting portion 3 can be displayed.

For example, each of the plurality of light-emitting portions 3 is arranged near an intersection of a line (address line) extending in the X direction and a line (data line) extending in the Y direction. When a signal is output between a specific address line extending in the X direction and a specific data line extending in the Y direction, the light-emitting portion 3 arranged near the intersection of these specific address line and data line emits light.

As illustrated in FIG. 2, the light-emitting portion 3 of the present embodiment has a circular shape in a plan view. However, the present embodiment is not limited thereto, and the light-emitting portion 3 in the plan view may have any shape such as a quadrangle.

The lighting cover 5 is a cover disposed over the plurality of light-emitting portions 3. Specifically, the lighting cover 5 has a plurality of isolation spaces 55 to be described below, accommodates one of the plurality of light-emitting portions 3 in one isolation space 55, and isolates the one light-emitting portion 3 from the other light-emitting portions 3. This enables the lighting cover 5 to guide light from each light-emitting portion 3 in the Z direction and prevent the light from leaking in the directions of the other light-emitting portions 3 (the X direction and the Y direction). As a consequence, the display device 100 can display clearer characters, figures, and the like by the dot matrix scheme.

The lighting cover 5 is arranged on a surface on which the light-emitting portions 3 of the substrate 1 are fixed.

(2) Configuration of Lighting Cover

Figure 3:
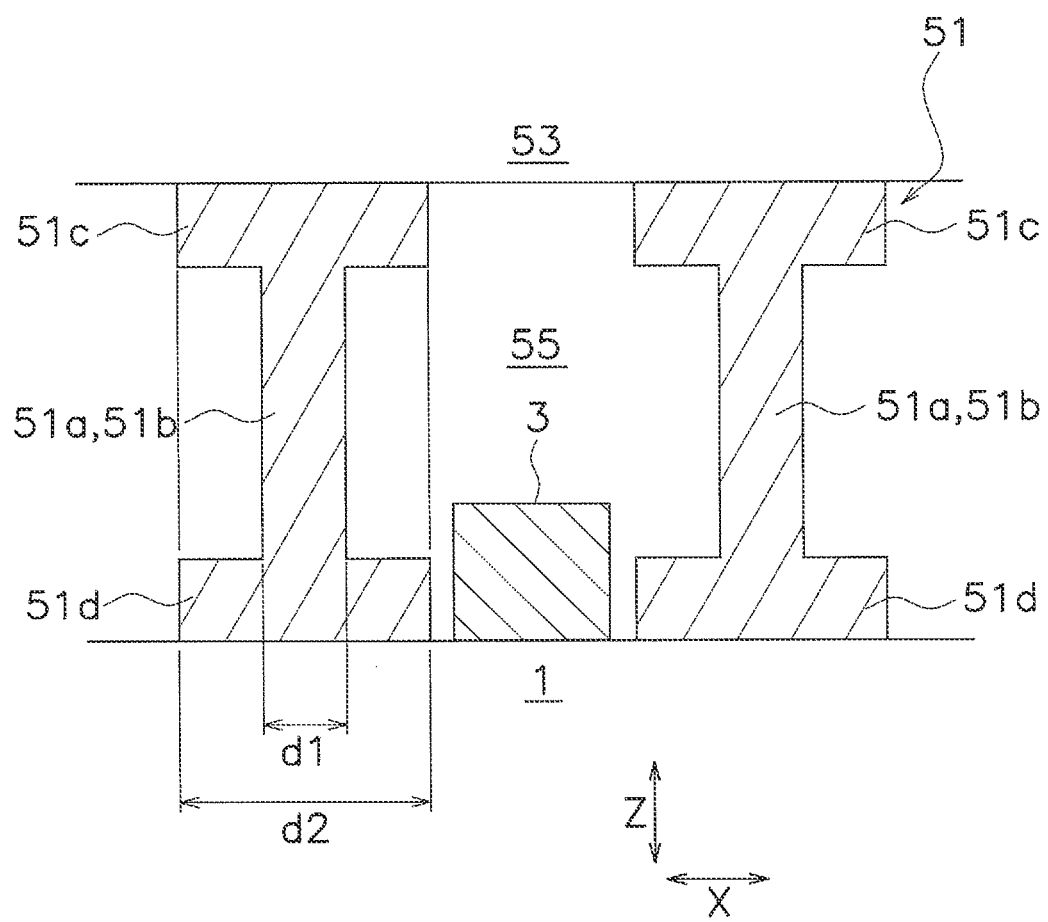
FIG. 3 is an enlarged view of a light guide member.

The lighting cover 5 provided in the display device 100 will be described in more detail with reference to FIG. 1 to FIG. 3. FIG. 3 is an enlarged view of a light guide member.

The lighting cover 5 accommodates one of the plurality of light-emitting portions 3 in one isolation space 55, and isolates the one light-emitting portion 3 from the other light-emitting portions 3. Specifically, the lighting cover 5 includes a light guide member 51 and a soft light-transmissive member 53.

The light guide member 51 guides light from the plurality of light-emitting portions 3. Specifically, the light guide member 51 includes a plurality of first light shielding walls 51*a* and a plurality of second light shielding walls 51*b*.

The plurality of first light shielding walls 51*a* extend in the X direction, and are arranged side by side at intervals in the Y direction by the size of at least one light-emitting portion 3.

The plurality of second light shielding walls 51*b* extend in the Y direction, and are arranged side by side in the X direction by the size of at least one light-emitting portion 3.

That is, in the light guide member 51, the plurality of first light shielding walls 51*a* and the plurality of second light shielding walls 51*b* are arranged in a lattice shape.

The plurality of first light shielding walls 51*a* and the plurality of second light shielding walls 51*b* are arranged in a lattice shape to form the plurality of isolation spaces 55 arranged to correspond to the plurality of light-emitting portions 3. The plurality of first light shielding walls 51*a* and the plurality of second light shielding walls 51*b* are arranged at intervals by the size of at least one light-emitting portion 3, and thus at least one light-emitting portion 3 can be accommodated in each of the isolation spaces 55.

The light-emitting portions 3 are respectively accommodated in the isolation spaces 55 each composed of the first light shielding wall 51*a* and the second light shielding wall 51*b*, and thus light from each light-emitting portion 3 can be guided in the Z direction and prevented from leaking in the directions (the X direction and the Y direction) of the other light-emitting portions 3.

The plurality of first light shielding walls 51*a* and the plurality of second light shielding walls 51*b* are each made of, for example, an elastomer such as urethane resin. The material of the guide member may be resin having rubber elasticity (silicon-based, fluorine-based, vinyl chloride-based, olefin-based, ethylene-based, or the like) other than urethane resin.

Furthermore, the light guide member 51 includes a surface wall 51*c* on a side opposite to a surface on which the substrate 1 of the first light shielding wall 51*a* and the second light shielding wall 51*b* is arranged, that is, on upper portions of the first light shielding wall 51*a* and the second light shielding wall 51*b*. The surface wall 51*c* supports, from below, the soft light-transmissive member 53 to be described below. This enables the soft light-transmissive member 53 to be reliably supported on the light guide member 51 so as not to be excessively close to the substrate 1 and/or the plurality of light-emitting portions 3.

The surface wall 51*c* is made of the same material as that of the first light shielding wall 51*a* and the second light shielding wall 51*b*, for example, an elastomer such as urethane resin.

As illustrated in FIG. 1, the first light shielding wall 51*a* and the surface wall 51*c*, and the second light shielding wall 51*b* and the surface wall 51*c* form an "I" shape in the cross-section in the Z direction. That is, a width d1 of the first light shielding wall 51*a* and the second light shielding wall 51*b* in a horizontal plane (X-Y plane) is smaller than a width d2 of the surface wall 51c in the horizontal plane. As a consequence, the rigidity of the first light shielding wall 51a and the second light shielding wall 51b against a pushing force in the Z direction is lower than that of the surface wall 51c against the pushing force in the Z direction.

The lower portion of the first light shielding wall 51a and the second light shielding wall 51b has the same width d2 as that of the surface wall 51c. Hereinafter, the lower portion of the first light shielding wall 51a and the second light shielding wall 51b is referred to as a base portion 51d.

By making the rigidity of the first light shielding wall 51a and the second light shielding wall 51b against the pushing force in the Z direction lower than that of the surface wall 51c against the force in the same direction, the light guide member 51 (that is, the lighting cover 5) can be made soft against the force in the Z direction. As a consequence, a user who touches the lighting cover 5 can recognize a tactile sensation that the lighting cover 5 is soft.

As an example of flexibility (rigidity) to be provided to the light guide member 51, when the display device 100 of the present embodiment is provided in an armrest in a vehicle, the rigidity of the first light shielding wall 51a and the second light shielding wall 51b against the pushing force in the Z direction can be set in the range of 1 N/mm to 30 N/mm, for example, assuming that an area of a fingertip is 1 cm², in order to enable the display device 100 to have the same tactile sensation as that of the armrest.

The width d1 of the first light shielding wall 51a and the second light shielding wall 51b for providing the rigidity described above is preferably in the range of, for example, 0.1 mm to 2 mm.

The light guide member 51 having the above "I" shape can be formed by, for example, a forming method using a 3D printer (for example, a continuous liquid interface production (CLIP) method). Alternatively, a molding method such as injection molding and reaction injection molding (RIM), and the like can also be used.

The soft light-transmissive member 53 is disposed on an outer side of the light guide member 51 and transmits light generated from the plurality of light-emitting portions 3. Specifically, the soft light-transmissive member 53 is a light-transmissive member fixed to the upper portion of the surface wall 51c of the light guide member 51. The soft transparent member 53 has a soft tactile sensation so that a user who touches the display device 100 feels the same tactile sensation as that of a location where the display device 100 is provided.

As the soft light-transmissive member 53 having flexibility and being light-transmissive, for example, a transparent or semi-transparent film-shaped member (for example, urethane-based, styrene-based, olefin-based, vinyl chloride-based, silicon-based or other resins), fabric (for example, cloth and the like), and the like can be used. When fabric is used as the soft light-transmissive member 53, light from the light-emitting portion 3 passes through gaps between fibers.

The soft light-transmissive member 53 also has a function of decorating the display device 100 by having the same external appearance, tactile sensation, and the like as those of a location where the display device 100 is provided.

As described above, the soft light-transmissive member 53 disposed on the outer side of the display device 100 has a soft tactile sensation and can transmit light generated from the plurality of light-emitting portions, thereby causing light from the plurality of light-emitting portions 3 to be output in a clear state and achieving a tactile sensation having the same flexibility as that of a location where the display device 100 is provided.

(3) Modified Examples of Light Guide Member

Figure 4:
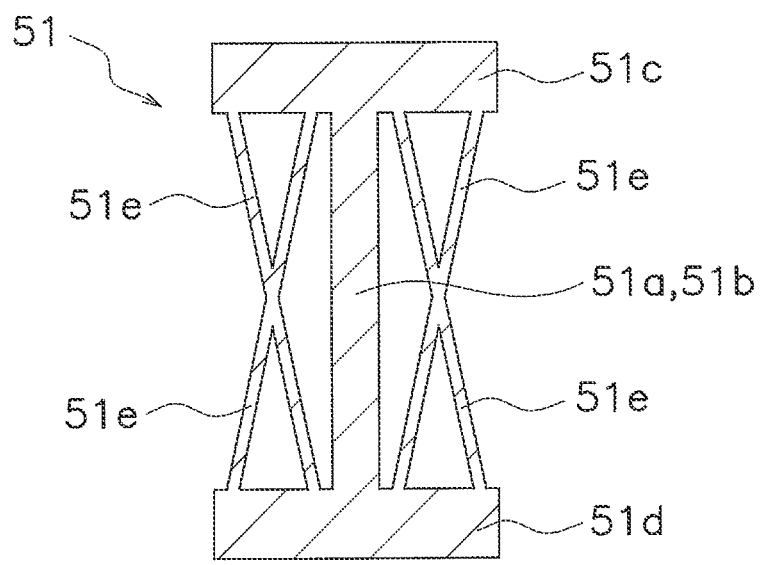
FIG. 4 is a view illustrating a first modified example of the light guide member.
Figure 5:
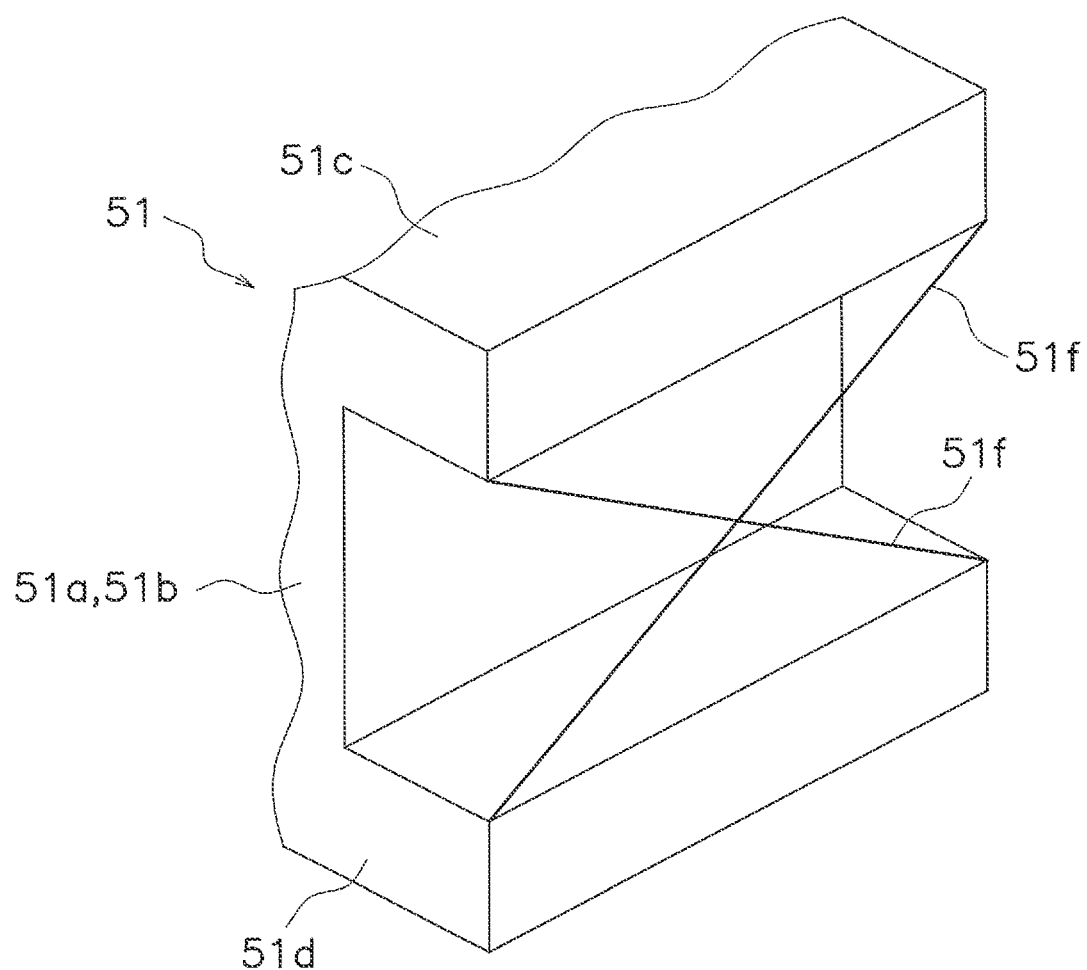
FIG. 5 is a view illustrating a second modified example of the light guide member.
Figure 6:
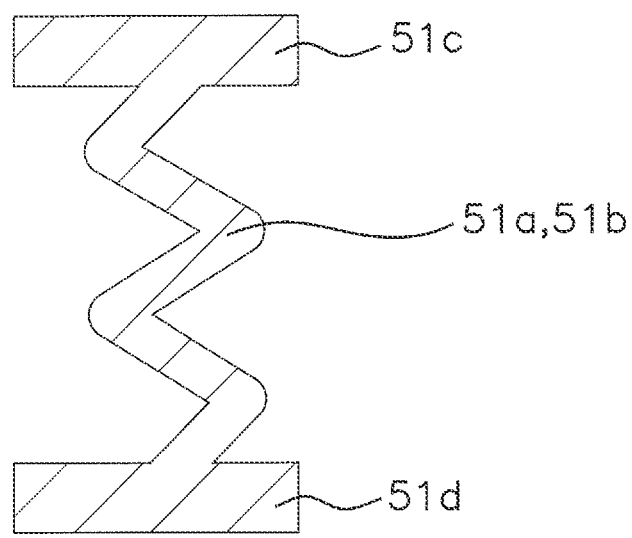
FIG. 6 is a view illustrating a third modified example of the light guide member.

Modified examples of the light guide member 51 will be described below with reference to FIG. 4 to FIG. 6. FIG. 4 is a diagram illustrating a first modified example of the light guide member. FIG. 5 is a diagram illustrating a second modified example of the light guide member. FIG. 6 is a diagram illustrating a third modified example of the light guide member. The light guide member 51 has the following modified examples in which the shapes of the first light shielding wall 51a and the second light shielding wall 51b are different.

In the following modified examples, durability against a pushing force from above can be improved compared to the light guide member 51 described above.

The first modified example illustrated in FIG. 4 is an example in which the light guide member 51 includes reinforcing walls 51e. Specifically, the reinforcing walls 51e are provided to connect a connection portion between an end of the base portion 51d of the first light shielding wall 51a and the second light shielding wall 51b and the surface wall 51c, and a connection portion between the first light shielding wall 51a and the second light shielding wall 51b and the base portion 51d with an end of the surface wall 51c by using diagonal lines.

The second modified example illustrated in FIG. 5 is an example in which the light guide member 51 includes linear reinforcing portions 51f. Specifically, the linear reinforcing portions 51f are provided to connect an end of the base portion 51d and an end of the surface wall 51c by using diagonal lines parallel to the first light shielding wall 51a and the second light shielding wall 51b.

The third modified example illustrated in FIG. 6 is an example in which the first light shielding wall 51a and the second light shielding wall 51b have a zigzag shape. The first light shielding wall 51a and the second light shielding wall 51b are formed in a zigzag shape, so that the elasticity of the first light shielding wall 51a and the second light shielding wall 51b in the Z direction can be improved.

2. Second Embodiment

In the first embodiment, as illustrated in FIG. 2, the light guide member 51 has the quadrangular isolation spaces 55 formed by providing the first light shielding walls 51a and the second light shielding walls 51b in a lattice shape. However, the light guide member is not limited to the above.

Figure 7:
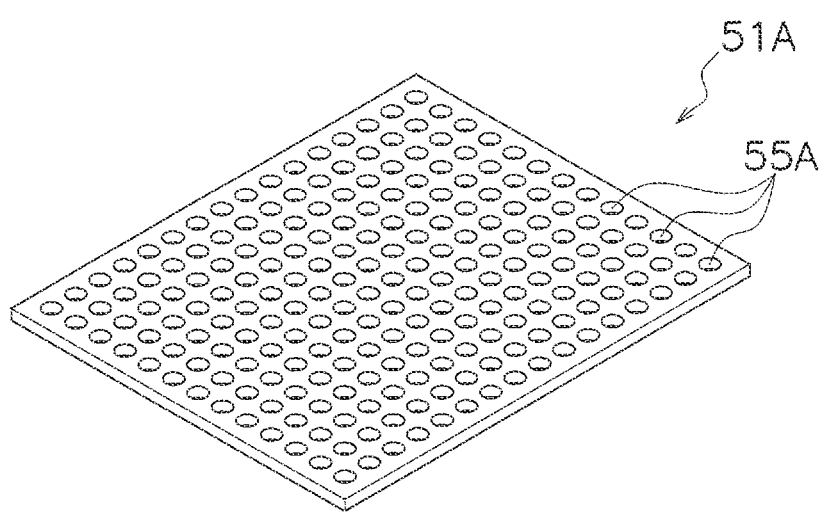
FIG. 7 is a view illustrating a light guide member of a second embodiment.

A modified example of the light guide member will be described as a second embodiment with reference to FIG. 7. FIG. 7 is a diagram illustrating a light guide member of the second embodiment.

A light guide member 51A includes circular holes 55A provided to correspond to a plurality of light-emitting portions (not illustrated).

In this embodiment, the rigidity of a surface wall of the light guide member 51A is higher than that of a light shielding wall, as in the first embodiment. Moreover, in this embodiment, the widths of the surface wall and a base portion of the light guide member 51A are the same as that of the light shielding wall (that is, the widths of the walls are constant). Consequently, a space formed by the light shielding wall is linear.

An example of a method for implementing a configuration in which the rigidity of the surface wall of the light guide member 51A is higher than that of the light shielding wall will be described below. For example, when the light guide member 51A is formed by urethane foam (RIM molding) and is subjected to hole drilling, a skin layer (corresponding to the surface wall) is formed on a surface layer. Since the skin layer has a higher foam density than a portion corresponding to the light shielding wall, the skin layer has a higher rigidity than the light shielding wall. As a consequence, a user who touches a lighting cover can recognize a tactile sensation that the lighting cover is soft.

3. Common Matters of Embodiments

In the first embodiment and the second embodiment, a lighting cover (for example, the lighting cover 5) is disposed over light-emitting portions (for example, the plurality of light-emitting portions 3). The lighting cover includes a light guide member (for example, the light guide member 51 or the light guide member 51A) and a soft light-transmissive member (for example, the soft light-transmissive member 53). The light guide member includes a plurality of isolation spaces (for example, isolation spaces 55 or holes 55A) arranged to correspond to the light-emitting portions, and guides light from the light-emitting portions. The soft light-transmissive member has a soft tactile sensation, and transmits light generated from the light-emitting portions by being disposed on an outer side of the light guide member.

As described above, in the lighting cover, the soft light-transmissive member that has a soft tactile sensation and transmits light is provided on the outer side of the light guide member. This enables the lighting cover to output light from the plurality of light-emitting portions in a clear state and to have a soft tactile sensation.

4. Other Embodiments

Although embodiments of the present invention have been described above, the present invention is not limited to the above-described embodiments, and various modifications can be made without departing from the gist of the invention. In particular, the plurality of embodiments and modified examples described herein can be combined arbitrarily with one another as necessary.

(A) The display device 100 may be provided with a touch sensor. In this case, the touch sensor and the display device 100 may be separated from each other, or the display device 100 and the touch sensor may be integrally formed.

When the display device 100 and the touch sensor are integrally formed, for example, one electrode for the touch sensor is provided on the substrate 1 and the other electrode for the touch sensor is provided on the soft light-transmissive member 53, so that a capacitance type touch sensor can be formed on the display device 100.

(B) The first light shielding wall 51a and/or the second light shielding wall 51b of the light guide member 51 may be provided inclined with respect to the Z direction.

INDUSTRIAL APPLICABILITY

The present invention can be widely applied to a lighting cover disposed over a plurality of light-emitting portions.

REFERENCE CHARACTER LIST

100 Display device
1 Substrate
3 Light-emitting portion
5 Lighting cover
51 Light guide member
51a First light shielding wall
51b Second light shielding wall
51c Surface wall
51d Base portion
51e Reinforcing wall
51f Linear reinforcing portion
53 Soft light-transmissive member
55 Isolation space

The invention claimed is:

1. A lighting cover disposed over a plurality of light-emitting portions, the lighting cover comprising:
   a light guide member including light shielding walls that form a plurality of isolation spaces arranged to correspond to the plurality of light-emitting portions, the light shielding walls being configured to guide light from the plurality of light-emitting portions upward in a Z direction; and
   a soft light-transmissive member having a soft tactile sensation, and transmitting light generated from the plurality of light-emitting portions by being disposed on an outer side of the light guide member, wherein
   the light guide member further comprises a plurality of surface walls, each surface wall being formed on a respective light shielding wall on an opposite side of the respective light shielding wall from a corresponding one the plurality of light-emitting portions, the plurality of surface walls being configured to support the soft light-transmissive member from below in the Z direction,
   in a cross-section along the Z-direction, the plurality of surface walls and the light shielding walls form a plurality of I shapes,
   the light shielding walls have a rigidity lower than a rigidity of the surface walls against a downward pushing force in the Z direction, and
   the rigidity of the light shielding walls against the pushing force in the Z direction is in the range of 1 N/mm to 30 N/mm.

2. The lighting cover according to claim 1, wherein the light shielding walls are thinner than the surface wall.

3. The lighting cover according to claim 1, wherein the light shielding walls have a zigzag shape.

4. A display device comprising:
   the lighting cover according to claim 3; and
   the plurality of light-emitting portions.

5. The lighting cover according to claim 1, wherein the light shielding wall and the surface wall are formed of an elastomer.

6. The lighting cover according to claim 5, wherein the light guide member further includes a base portion formed on the same side as the side of the plurality of light-emitting portions of the light shielding walls, and widths of the base portion and the surface wall are larger than widths of the light shielding walls.

7. The lighting cover according to claim 6, wherein the light shielding walls include a plurality of first light shielding walls and a plurality of second light shielding walls, and
   the plurality of first light shielding walls and the plurality of second light shielding walls are spaced apart respectively from each other in a grid pattern by a size of one of the plurality of light emitting portions.

8. The lighting cover according to claim 7, wherein at least one of the first light shielding walls and the second light shielding walls are inclined with respect to the Z direction.

9. The lighting cover according to claim 7, wherein the light guide member includes a reinforcing wall, and the reinforcing wall is provided to connect an end of the base portion with a connection portion between the first light shielding walls or the second light shielding walls and the surface wall by using a diagonal line, and to connect an end of the surface wall with a connection portion between the base portion and the first light shielding walls or the second light shielding walls by using a diagonal line.

10. The lighting cover according to claim 7, wherein the light guide member includes a linear reinforcing wall, and the linear reinforcing wall is provided to connect an end of the base portion and an end of the surface wall by using a diagonal line parallel to the first light shielding walls and the second light shielding walls.

11. A display device comprising:
the lighting cover according to claim 7; and
the plurality of light-emitting portions.

12. The lighting cover according to claim 1, wherein the light guide member further includes a base portion formed on the same side as the side of the plurality of light-emitting portions of the light shielding walls, and widths of the surface wall and the base portion are the same as widths of the light shielding walls.

13. The lighting cover according to claim 12, wherein the light guide member is a foam molded product, and the surface wall is a skin layer having a higher foam density than a foam density of the light shielding wall.

14. The lighting cover according to claim 1, wherein the soft light-transmissive member is either a transparent or translucent film-shaped member or a fabric.

15. A display device comprising:
the lighting cover according to claim 1; and
the plurality of light-emitting portions.

16. The display device according to claim 15, further comprising
a substrate fixing the plurality of light-emitting portions, and including an electric circuit that controls light emission of the plurality of light-emitting portions.

17. The display device according to claim 16, further comprising a capacitance type touch sensor integrally formed with the display device, wherein
the touch sensor includes:
a first electrode of the touch sensor formed on the substrate; and
a second electrode of the touch sensor formed on the soft light-transmissive member.

18. The display device according to claim 16, wherein the lighting cover is arranged on a surface on which the plurality of light emitting portions of the substrate are fixed.

19. The display device according to claim 15, provided in an armrest in a vehicle.

20. The lighting cover according to claim 1, wherein each isolation space is arranged between two respective adjacent I shapes of the plurality of I shapes in an X direction orthogonal to the Z direction.

* * * * *